(12) United States Patent
Christopher et al.

(10) Patent No.: US 10,567,635 B2
(45) Date of Patent: Feb. 18, 2020

(54) THREE DIMENSIONAL MOVING PICTURES WITH A SINGLE IMAGER AND MICROFLUIDIC LENS

(71) Applicant: Indiana University Research and Technology Corporation, Indianapolis, IN (US)

(72) Inventors: Lauren Christopher, Indianapolis, IN (US); Chao Liu, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 186 days.

(21) Appl. No.: 15/308,833

(22) PCT Filed: May 15, 2015

(86) PCT No.: PCT/US2015/031026
§ 371 (c)(1),
(2) Date: Nov. 3, 2016

(87) PCT Pub. No.: WO2015/175907
PCT Pub. Date: Nov. 19, 2015

(65) Prior Publication Data
US 2017/0078559 A1    Mar. 16, 2017

Related U.S. Application Data

(60) Provisional application No. 61/993,300, filed on May 15, 2014.

(51) Int. Cl.
*H04N 5/232* (2006.01)
*H04N 13/257* (2018.01)
*H04N 13/275* (2018.01)

(52) U.S. Cl.
CPC ...... *H04N 5/23212* (2013.01); *H04N 5/23229* (2013.01); *H04N 13/257* (2018.05); *H04N 13/275* (2018.05)

(58) Field of Classification Search
CPC .... G06T 7/571; H04N 13/236; H04N 13/257; H04N 13/275; H04N 2013/0081; H04N 5/23212; H04N 5/23229
See application file for complete search history.

(56) References Cited

U.S. PATENT DOCUMENTS

2004/0017595 A1 * 1/2004 Ikeda ............... G06K 15/00
                                                  358/518
2005/0218231 A1 * 10/2005 Massieu ............ G02B 3/14
                                                  235/472.01

(Continued)

OTHER PUBLICATIONS

International Search Report and Written Opinion issued by the ISA/US, Commissioner for Patents, dated Aug. 12, 2015, for International Application No. PCT/US2015/031026; 11 pages.

(Continued)

*Primary Examiner* — Peter D Le
(74) *Attorney, Agent, or Firm* — Faegre Baker Daniels LLP

(57) ABSTRACT

A method and system for determining depth of an image using a single imager and a lens having a variable focal length is provided. The system comprises a microfluidic lens having a variable focal length controlled by a lens controller and an imager receiving an image of an object from the lens, wherein the imager is configured to receive a first image comprising a first plurality of pixels from the lens at a first focal length and a second image comprising a second plurality of pixels from the lens at a second focal length, the second focal length being different than the first focal length, non-volatile memory, wherein the first image and the second image are stored in the non-volatile memory, a depth module (Continued)

configured to determine a distance between the lens and the object based by a comparison of the first image of the object and the second image of the object.

18 Claims, 19 Drawing Sheets

(56) References Cited

U.S. PATENT DOCUMENTS

| | | | |
|---|---|---|---|
| 2007/0031041 A1* | 2/2007 | Ko | G06K 9/00234 382/190 |
| 2007/0097249 A1* | 5/2007 | Korenaga | G02B 5/1876 348/335 |
| 2007/0104472 A1* | 5/2007 | Quan | G03B 7/08 396/79 |
| 2008/0291291 A1* | 11/2008 | Kim | H04N 5/2351 348/226.1 |
| 2008/0309662 A1* | 12/2008 | Hassner | G06K 9/20 345/419 |
| 2010/0080448 A1* | 4/2010 | Tam | H04N 13/0257 382/154 |
| 2010/0195898 A1* | 8/2010 | Bang | G06T 5/50 382/154 |
| 2011/0032341 A1* | 2/2011 | Ignatov | H04N 13/144 348/51 |
| 2011/0141237 A1 | 6/2011 | Cheng et al. | |
| 2011/0249173 A1* | 10/2011 | Li | H04N 5/23212 348/349 |
| 2011/0261178 A1* | 10/2011 | Lo | A61B 1/05 348/68 |
| 2011/0267486 A1* | 11/2011 | Kane | H04N 5/2226 348/222.1 |
| 2012/0052563 A1* | 3/2012 | Liang | H04N 7/183 435/287.2 |
| 2012/0243777 A1 | 9/2012 | Christopher et al. | |
| 2012/0281132 A1 | 11/2012 | Ogura et al. | |
| 2012/0293624 A1* | 11/2012 | Chen | H04N 13/0022 348/46 |
| 2013/0010067 A1 | 1/2013 | Veeraraghavan et al. | |
| 2013/0033608 A1 | 2/2013 | Hong | |
| 2013/0188019 A1 | 7/2013 | Christopher et al. | |
| 2013/0208088 A1 | 8/2013 | Ishii et al. | |
| 2014/0118494 A1* | 5/2014 | Wu | G06T 7/20 348/44 |

OTHER PUBLICATIONS

Chao Liu, Laurent A. Christopher, "Three Dimensional Moving Pictures with a Single Imager and Microfluidic Lens", 9 pages.

D. Scharstein and R. Szeliski, "A taxonomy and evaluation of dense two frame stereo correspondence algorithms," *International Journal of Computer Vision*, pp. 47(1/2/3), 7-42.

T. E. Bishop and P. Favaro, "The light field camera: extended depth of field, aliasing, and superresolution," *Pattern Analysis and Machine Intelligence, IEEE Transactions on*, vol. 34, No. 5, pp. 972-986, May 2012.

P. A. Pentland, "A new sense for depth of field," *IEEE Transactions on Pattern Analysis and Machine Intelligence*, vol. 4, No. PAMI-9, pp. 523-531, Jul. 1987.

J. Ens and P. Lawrence, "An investigation of methods Transactions on Pattern Analysis and Machine Intelligence, for determining depth from defocus," *IEEE Transactions on Pattern Analysis and Machine Intelligence*, vol. 15, No. 2, pp. 97-107, 1993.

S. Geman and D. Geman, "Stochastic Relaxation, Gibbs Distributions, and the Bayesian Restoration of Images," *IEEE Transactions on Pattern Analysis and Machine Intelligence*, vols. PAMI-6, No. 6, pp. 721-741, 1984.

J. Marroquin, S. Miner and T. Poggio, ""Probabilistic solution of ill-posed problems in computational vision"," *J. Amer. Statist. Assoc.*, vol. 82, No. 397 (Mar. 1987), pp. 76-89.

R. Szeliski, R. Zabih, D. Scharstein, O. Veksler, V. Kolmogorov, A. Agarwala, M. Tappen and C. Rother, "A Comparative Study of Energy Minimization Methods for Markov Random Fields with Smoothness-Based Priors," vol. 30, No. 6, Jun. 2008.

J.-I. Jung and Y.-S. Ho, "Depth image interpolation using confidence-based Markov Random Field," *IEEE Transactions on Consumer Electronics*, vol. 58, No. 4, pp. 1399-1402, 2012.

C.-C. Cheng, C.-T. Li and L.-G. Chen, "A novel 2D-to-3D conversion system using edge information," *IEEE Transactions on Consumer Electronics*, vol. 56, No. 3, pp. 1739-1745, 2010.

T.-Y. Kuo and Y.-C. Lo, "Depth estimation from a monocular view of the outdoors," *IEEE Transactions on Consumer Electronics*, vol. 57, No. 2, pp. 817-822, 2011.

B. Berge, "Liquid Lens Technology: Principle of Electrowetting based lenses and applications to imaging," 2005.

M. Agarwal, R. A. Gunasekaran, P. Coane and K. Varahramyan, "Fluid-activated variable focal length polymer microlens system," in *Proceedings of the SPIE, MOEMS Display and Imaging Systems III*, 2005.

M. L. Comer and E. J. Delp, "The EM-MPM algorithm for segmentation of textured images: Analysis and further experimental results," *IEEE Transactions on Image Processing*, pp. vol. 9, No. 10, 2000.

D. Scharstein and R. Szeliski, "High-accuracy stereo depth maps using structured light," in *IEEE Computer Society Conference on Computer Vision and Pattern Recognition*, Madison, WI, 2003.

D. Scharstein and C. Paul, "Learning conditional random fields for stereo," in *IEEE Computer Society Conference on Computer Vision and Pattern Recognition*, Minneapolis, MN, 2007.

A. Rajagopalan and S. Chaudhuri, "Depth Estimation and Image Restoration Using Defocused Stereo Pairs," *IEEE Transactions on Pattern Analysis and Machine Intelligence*, vol. 26, No. 11, pp. 1521-1525, 2004.

P. Favaro, "A geometric approach to shape from defocus," *IEEE Transactions on Pattern Analysis and Machine Intelligence*, vol. 27, No. 3, pp. 406-417, 2005.

A. J. Bower, R. M. Bunch, P. O. Leisher, W. Li and L. A. Christopher, "Correction of a liquid lens for 3D imaging systems," in *Proc. SPIE; Optical Modelling and Design II*, Brussels, Belgium, 2012.

L. A. Christopher and W. Li, "A single-imager, single-lens video camera prototype for 3D imaging," in *Proc. SPIE: Three-Dimensional Image Processing (3DIP) and Applications II*, Burlingame, CA, USA, 2012.

Y. Sun and L. A. Christopher, "3D Image Segmentation Implementation on FPGA Using the EM/MPM Algorithm," in *IEEE International Conference on Acoustics, Speech and Signal Processing (ICASSP)*, Dallas, 2010.

S. Chaudhuri and A. N. Rajagopalan, Depth from Defocus: A real aperture imaging approach, Springer-Verlag, 1999.

* cited by examiner

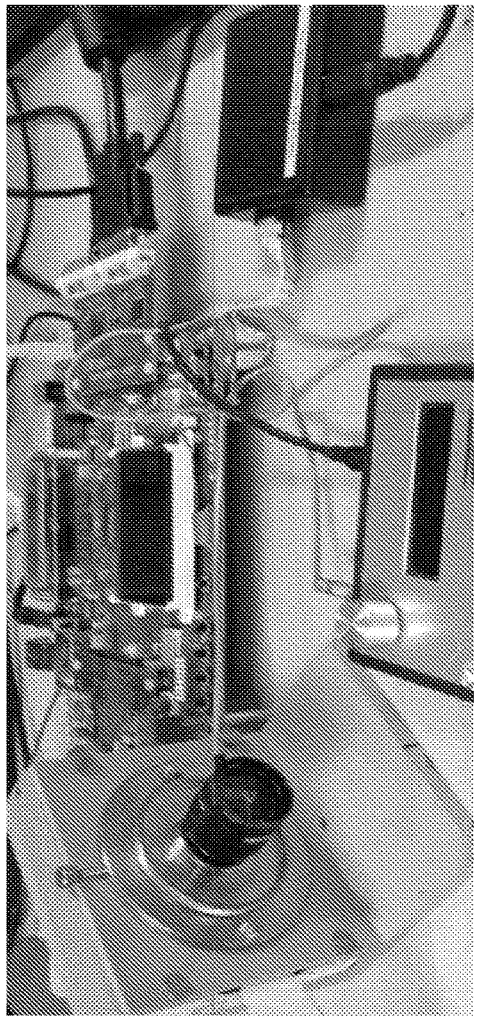
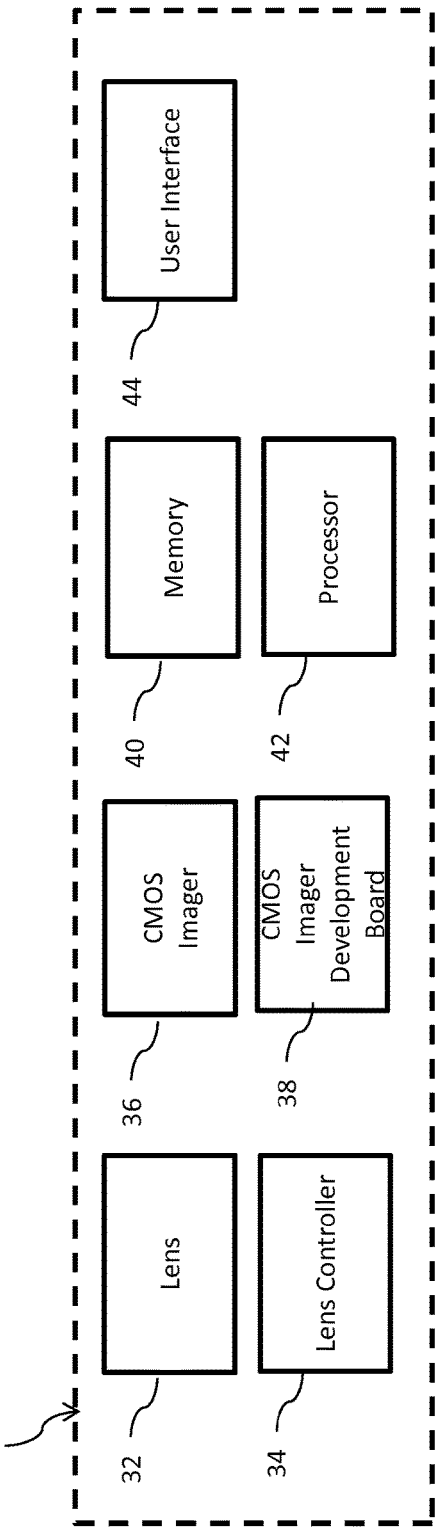

ized to fit with the form factor of a small consumer camera, such as the type in cell phones and tablet devices. In addition, the cost of the current systems includes two imagers and/or expensive lens arrays or ranging devices.

THREE DIMENSIONAL MOVING PICTURES WITH A SINGLE IMAGER AND MICROFLUIDIC LENS

CROSS-REFERENCE TO RELATED APPLICATIONS

This application is a U.S. National Phase Patent Application based on International Application No. PCY/US2015/031026, filed May 15, 2015, which claims priority to U.S. Provisional Patent Application 61/993,300, filed May 15, 2014, the entire disclosures of which are hereby expressly incorporated by reference.

FIELD OF THE DISCLOSURE

This disclosure relates to video signal acquisition. More specifically, this disclosure relates to three-dimensional movie acquisition with corresponding depth data.

BACKGROUND AND SUMMARY

Depth inference is a key research area for modeling 3D objects in the 3D environment; for consumer electronics, robotics, and computer vision. In consumer electronics, depth maps are used in Depth Image Based Rendering (DIBR) displays, they are used as part of improved efficiency 3D compression algorithms, and can be used in future virtual reality. Depth may be inferred using stereo disparity; however this requires multiple source images where two cameras or complex optics are needed to achieve the left-right views. Depth also may be found by ranging techniques, but this requires additional transmit and receive hardware. New light-field or integral imaging cameras can produce depth, but the microlens array reduces the maximum imager resolution capability. Typical current 3D imaging systems cannot be easily miniaturized to fit with the form factor of a small consumer camera, such as the type in cell phones and tablet devices. In addition, the cost of the current systems includes two imagers and/or expensive lens arrays or ranging devices.

Depth from defocus inference requires only one imager capturing two focus images, which can be done with a standard camera with varying focus. Inferring depth is done by a pixel-by-pixel comparison of two or more defocussed images, where the object's blur radius is related to its distance. This depth inference uses Bayesian and Markov Random Field (MRF) statistical structure. The classical approach can be improved by combination with other computational imaging techniques.

Extended Depth from Defocus (EDfD) extends classical DfD using a new optimization function, extended to adapt to both the image's color data and high frequency image data. Significant depth accuracy improvements compared to the currently published DfD techniques have been observed.

Depth is important in new consumer electronics products in order to create immersive 3D experiences for the user with new 3D displays. Accurate depth information is also needed for improved compression efficiency and for super-resolution techniques. A method for enhancing a ranging camera's resolution has been reported using Markov Random Field methods with the 2D image to provide a more accurate depth result for DIBR display, in which a ranging camera is used in addition to the visible light imager. Additional methods of 2D to 3D conversion using edge information from the 2D image to provide a depth map from a hypothesis depth map starting point; or by providing a depth map specifically for outdoor scenes using the dark channel (the effect of haze in the image) to estimate depth. The results from EDfD show significant quality improvement compared to these two papers, and EDfD is generally applicable to a variety of scenes.

For the EDfD method, fast focus optics is required. Bio-inspired microfluidic lenses allow a time-domain approach for the very fast focus change. These lenses use two fluids and electrostatic forces to rapidly change the shape of a very small lens. System design requires balancing the maximum focus speed of the microfluidic lens with the capability and accuracy of the depth inference.

An extended DfD depth inference method, together with a fast focus lens which enables depth map generation of an average accuracy 4.67 RMSE compared to ground truth, and small size due to a single imager is presented. The computational complexity is similar to other methods. The results are provided for synthetic blur images for accuracy testing and for a single imager matched with microfluidic lens for generating the 2 focus images.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 7A is an all in focus image. FIG. 7B is a defocus image. FIG. 7C is a depth ground truth. FIG. 7D is a texture image. FIG. 7E is an initial depth map. FIG. 7E is a final depth map after using texture information.

FIG. 9A is an in focus image. FIG. 9B is a synthetic defocus image. FIG. 9C is the ground truth. FIG. 9D is an initial depth map with grayscale input. FIG. 9E is a depth map with color input without texture information. FIG. 9F is a final depth map.

FIG. 11A is an in focus image. FIG. 11B is the ground truth. FIG. 11C EDfD results. FIG. 11D is SA results. FIG. 11E is shape from defocus results. FIG. 12F is 3D view maps.

FIGS. 12A and 12B exemplary single imager systems.

FIG. 13A is an infocus image captured by the camera. FIG. 13B is a defocus image captured by the camera. FIG. 13C is a EDfD depth map. FIG. 13D is a 3D view map of EDfD depth map. FIG. 13E is a 3D view map of in focus image.

FIG. 14A is an in focus image captured by the camera. FIG. 14B is a defocus image capture by camera. FIG. 14C is an EDfD depth map. FIG. 14E is a 3D view map of an in focus image.

FIG. 15A is an in focus image capture the camera. FIG. 15B is a defocus image captured by the camera. FIG. 15C is an EDfD depth map. FIG. 15D is a 3D view map of EDfD depth map. FIG. 15E is a 3D view map of in focus image.

FIG. 16A is an in focus image captured by the camera. FIG. 16B is a defocus image captured by the camera. FIG. 16C is an EDfD depth map. FIG. 16D is a 3D view map of EDfD depth map. FIG. 16E is a 3D view map of in focus image.

FIG. 19A shows in the in-focus image. FIG. 19B shows the defocus image. FIG. 19C shows the ground truth. FIG. 19D shows the depth result using space-invariant Gaussian filter to model. FIG. 19 E shows the depth result using the correct space-varying Gaussian model.

Figure 1:
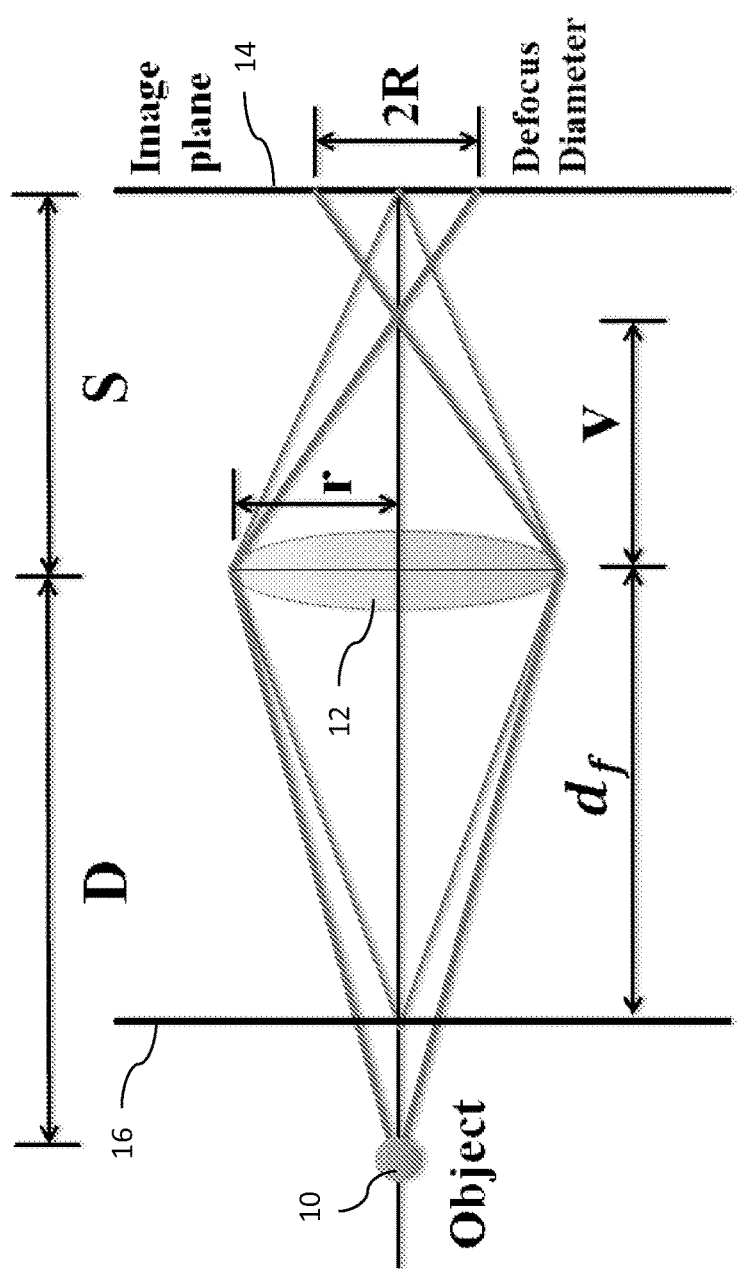
FIG. 1 is an illustration of DfD algorithm with a defocused object.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION

The embodiment disclosed below is not intended to be exhaustive or limit the invention to the precise form disclosed in the following detailed description. Rather, the embodiment is chosen and described so that others skilled in the art may utilize its teachings.

I. Theoretical Background Basis

In this section, short review of the classical algorithms used in DfD is presented. There are three main concepts. First is the relationship between depth and defocus blur radius. Second is the statistical Maximum a Posteriori (MAP) estimation used for estimating the depth at each pixel in the image. Third is Expectation Maximization of the posterior marginal distribution (EM/MPM) for refining the MAP estimate. The EM/MPM and Graph-cut MAP methods optimize the same objective function.

A. Review of Depth from Defocus

Referring first to FIG. 1, for a single thin lens imaging model with focal length f, the basic equation is given by Equation (1):

$$\frac{1}{D} + \frac{1}{v} = \frac{1}{f} \tag{1}$$

Where D is the distance of the object 10 from the lens 12 and v is the distance between lens 12 and focused image plane 14. When the position of this object 10 is not in focus, the light rays coming through a lens 12 are intercepted and spread within an area in the image plane 14 as shown in FIG. 1.

In FIG. 1, $d_f$ is defined as the distance between the lens 12 and focus point 16, and r is the radius of the lens. Therefore, the relationship is:

$$\frac{R}{r} = \frac{S-v}{v} \tag{2}$$

$$\frac{1}{d_f} + \frac{1}{S} = \frac{1}{f} \tag{3}$$

Using Equations (2) and (3), they are combined to form equation (4). If camera settings $d_f$, f, r are given; the radius of the blur circle, R, is a non-linear monotonically increasing function of D, the distance between object 10 and lens 12. This implies the image captured by camera would have increasing blur for increasing distance between the object 10 and lens 12 for the far field.

$$R = rS\left(\frac{1}{f} - \frac{1}{D} - \frac{1}{S}\right) = \frac{rd_f f}{d_f - f}\left(\frac{1}{d_f} - \frac{1}{D}\right) \tag{4}$$

As mentioned above, because the blur diameter is related to the depth, then an estimate of the depth can be made based on two different focus images of the same scene. The defocus is measured at each pixel in the image and is modeled as a convolution of the in-focus image and a point spread function (PSF). Initially, a symmetric 2D Gaussian function h(x,y) is used to model the PSF. A defocused image is denoted by a convolution: b(x,y)=f(x,y)*h(x,y). The 2D Gaussian blur parameter, σ, is proportional to R, and the depth D can be calculated using Equation (4).

B. MAP Estimation

Figure 2:
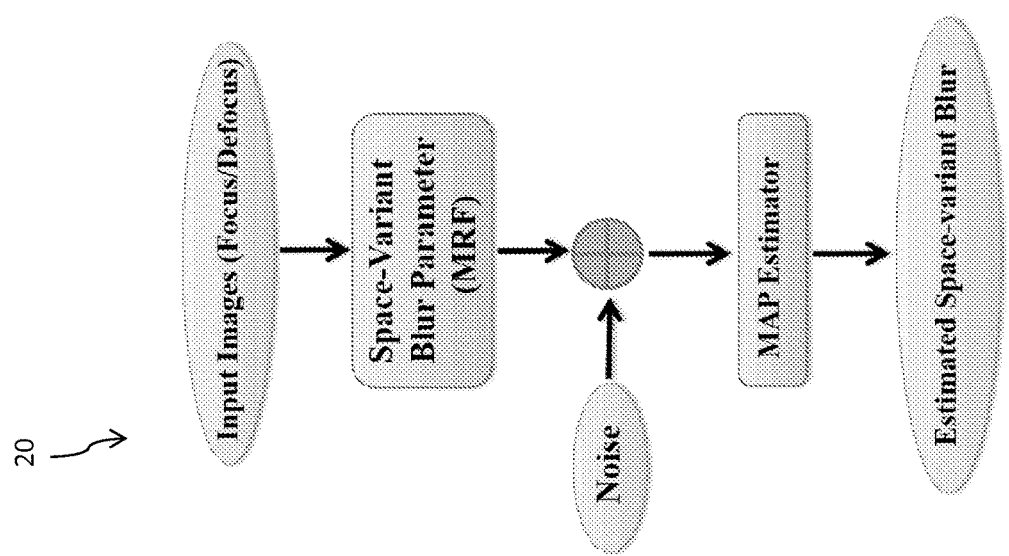
FIG. 2 is a General MAP E system block diagram.

The general MAP Estimation technique has been widely used in such applications such as denoising, deblurring and segmentation. In the method 20 as shown in FIG. 2, the general MAP Estimation technique is combined with Markov Random Filed (MRF) and Bayesian statistical estimator to estimate depth label for each pixel as shown in FIG. 2.

Two input images are used to determine the blur. The first is an all-focus or in-focus image f(x,y), and the second is the defocused image g(x,y). So g(x,y) can be represented as:

$$g(x,y)=f(x,y)*h(x,y)+w(x,y) \tag{5}$$

Where h(x,y) is the space-variant blur function modeled by the Gaussian kernel, and w(x,y) is the noise.

Let S denote the depth label of pixel, then a prior distribution p(s) can be used with a Markov Random Field (MRF) model. The blur is quantized to 256 classes (8 bits) of space-variant blur parameter a. Then, based on Equation (5), the a posteriori probability distribution of S can be expressed as: P(S=s|G=g). Using Bayes' equation, the closed form of the distribution is given below as Equations (6) (7), where z is a normalizing constant for the prior probabilities:

$$P(S=s \mid G=g) = \frac{P(G=g \mid S=s)P(S=s)}{P(G=g)} \tag{6}$$

$$p(s) = \frac{1}{z}\exp\left(-\beta \sum_{r \in N_c} |S_r - S_c|\right) \tag{7}$$

Maximizing P(S=s|G=g) is equivalent to minimizing the energy function described by Equation (8). This is done on a pixel by pixel basis, so the blur class (value) will vary over the image.

$$U(S) = |g(x, y) - f(x, y) * h(x, y)|^2 + \beta \sum_{r \in N_c} |S_r - S_c| \quad (8)$$

This energy function has two terms. The first term, the data-dependent term, is the mean squared error difference of the blur image and a particular choice of blur kernel convolved with the in-focus image. The second term, sometimes called the smoothing term, calculates the differences in choice of depth classes in every 8-neighbor clique. This second term, the Bayesian prior, measures how different a choice of depth is from its immediate neighbors. In Equations (7), Sc is depth class label of center pixel c; Sr is depth class label of neighbor r; Nc is defined as all 8 neighbors of center pixel c, and where z is a normalizing constant. Finally, β is the weighting factor which balances the data term and the smoothing term. The better choice of blur class value will minimize this energy function, allowing the convolution, b(x,y), to be closer to the true defocus g(x,y), while at the same time keeping a smoothness among all neighboring pixels.

C. EM/MPM

In order to find the best choice of blur label for each pixel, optimization process is needed. MAP optimization has been reported using Simulated Annealing (SA) as the optimization process. The choice in this research is EM/MPM, which has some advantages compared to SA, both in convergence speed and in optimization over local areas. As will be seen in the results, the performance is compared between SA and EM/MPM methods on the same test data, and EM/MPM is chosen because of its overall better accuracy.

The general EM/MPM algorithm consists of two parts: Expectation Maximization (EM) and Maximization of Posterior Marginals (MPM). The EM algorithm finds the estimates for Gaussian mean and variance, while MPM classifies the pixels into N class labels, using estimated parameters from EM.

The Gaussian mixture model used here means that Equation (6) is modified into (9) and (10). Here $\sigma^2_{sc}$ is variance of each class; $\mu_{sc}$ is mean for each class; $s_c$ is blur class of the pixel c; $g_c$ is the pixel in the input defocussed image at location c; θ is the vector of means and variances of each class.

$$p_{s|g}(s \mid g, \theta) = \frac{f_{g|s}(g \mid s, \theta) p_s(s)}{f_g(g \mid \theta)} \quad (9)$$

$$f_{g|s}(g \mid s, \theta) = \prod_{c \in C} \frac{1}{\sqrt{2\pi \sigma^2_{s_c}}} \exp\left\{-\frac{(g_c - \mu_{s_c})^2}{2\sigma^2_{s_c}}\right\} \quad (10)$$

At the beginning of this process, a random blur class label is initialized into every pixel in S. An evenly distributed vector of means and variances is used as a starting point for the classes. Then, the estimate of S is formed by iterating several times through the whole image. At each iteration, two steps are performed: the expectation step and maximization step. First maximization step is performed based on Equation (11), (12) and (13), then in expectation step, iterating using MPM to find the best log-likelihood of the probability that a particular pixel belongs to one of the 256 blur classes.

$$\mu_k(c) = b_k(c) = f(c) * h_k(c) \quad (11)$$

$$\sigma^2_k = \frac{1}{N_k} \sum_{c \in C} (g_c - \mu_k(c))^2 p_{S_c|g}(k \mid g, \theta) \quad (12)$$

$$N_k = \sum_{c \in C} p_{S_c|g}(k \mid g, \theta) \quad (13)$$

For MPM, convergence is achieved by choosing the best blur class label which minimizes the expected value of the number of misclassified pixels. The final energy function is calculated in the log domain, eliminating constants and exponentials as shown in equation (14).

$$S_c = \operatorname{argmin}\left\{\log \sigma_{S_c} + \frac{(g_c - b_{k_c})^2}{2\sigma^2_{S_c}} + \beta \sum_{r \in N_c} |S_r - S_c|\right\} \quad (14)$$

Equation (14) is the basic optimization function.

II. Use of EDfD

A. Algorithm Overview

Figure 3:
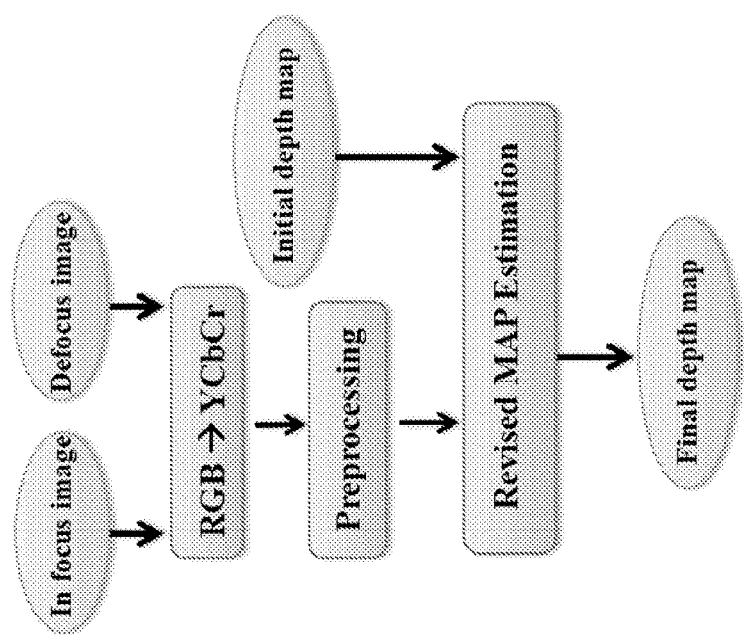
FIG. 3 is an overview of the proposed algorithm.

The classical DfD algorithm compares individual pixels of the defocused image to the all in-focus image passed through the Gaussian filters, according to the energy function of Equation (14). In contrast to the traditional approaches which only have used grayscale images as input images, EDfD research takes advantage of the color images. An exemplary method 22 is shown in FIG. 3. An all-focus image and a defocused image of the same scene is the input to the EDfD. The first step converts both of these two color images into YCbCr channel. The Y channel contains the intensity of color image, and the Cb (blue difference chroma) and Cr (red difference chroma) channels are added to improve the accuracy of depth estimation.

After splitting the two input images into three channels, a new preprocessing procedure is used on the in-focus image before doing MAP estimation. The preprocessing procedure has two main tasks. Image processing is used to distinguish textured and texture-less regions of the image. Second, the edges in the image are isolated with a highpass filter.

Next an initial depth map is combined with the output of previous steps as input to the revised MAP estimator, and the final depth map is the output.

B. Initial Depth Map Generation

Figure 4:
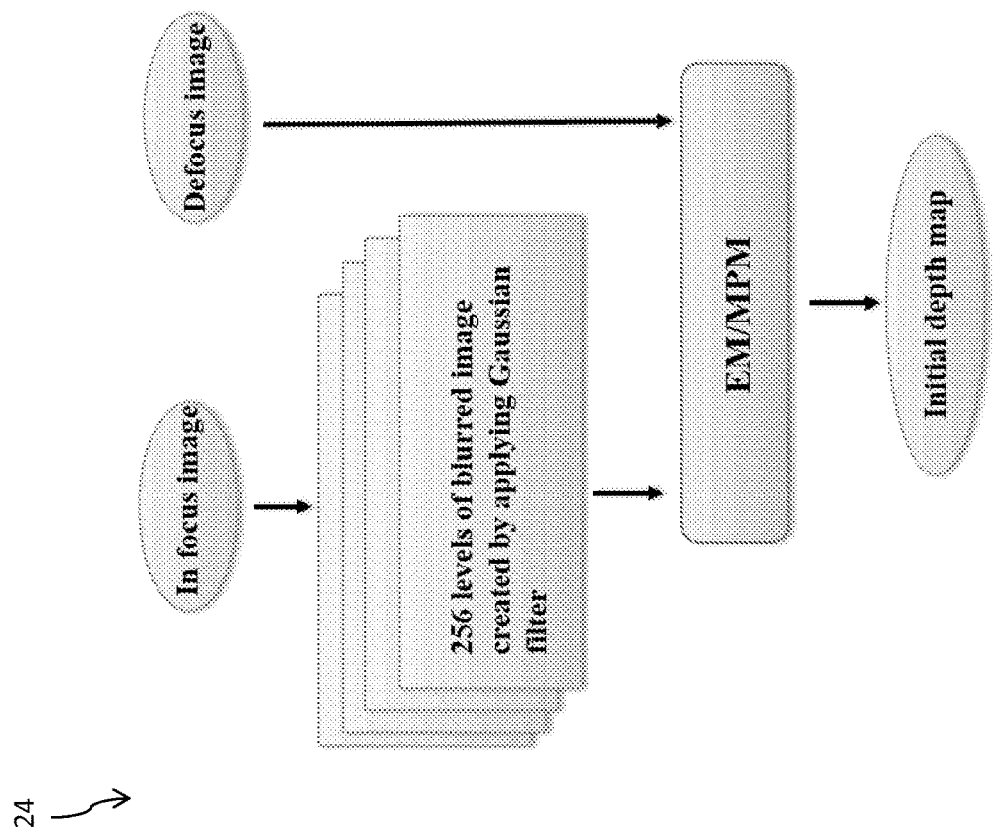
FIG. 4 shows an initial MAP estimation.

Initial depth map generation provides a baseline of the whole algorithm. The EM/MPM optimization algorithm is used in the MAP Estimator, as shown in exemplary method 24 of FIG. 4. In FIG. 4, the greyscale all in-focus image $I_{inf}$ and defocused image $I_{def}$ are the input to the initial MAP estimator. 256 levels of blurred images $I_{b1}, I_{b2}, \ldots, I_{b256}$ are created by applying 256 different Gaussian filters to $I_{inf}$. The Gaussian blur parameters are chosen with equal step size. At the same time, depth class label map $I_s$ is initialized as a MRF with the same image size as $I_{inf}$ and $I_{def}$. Starting from $I_g$ as initial depth map, $I_g, I_{def}, I_{b1}, I_{b2}, \ldots, I_{b256}$ are passed to the initial MAP estimator.

For each pixel c with depth class label k (k=1, 2, ..., 256), the data term, d(c,k), and smoothness term, prior(c,k), are calculated using Equation (15) and (16). Based on Equation (14) the energy function can be expressed as Equation (17).

$$d(c, k) = |I_{def}(c) - I_{bk}(c)| \quad (15)$$

$$\text{prior}(c, k) = \sum_{r \in N_c} |I_s(r) - S_c(k)| \quad (16)$$

$$\text{logpost}(c, k) = \log \sigma_k + \frac{(I_{def}(c) - I_{bk}(c))^2}{2\sigma_k^2} + \sum_{r \in N_c} |I_s(r) - S_c(k)| \quad (17)$$

Finally, the initial depth map $I_s$ is generated by optimizing logpost(c,k) for each pixel using EM/MPM or Graph-cut.

C. Preprocessing

Figure 5:
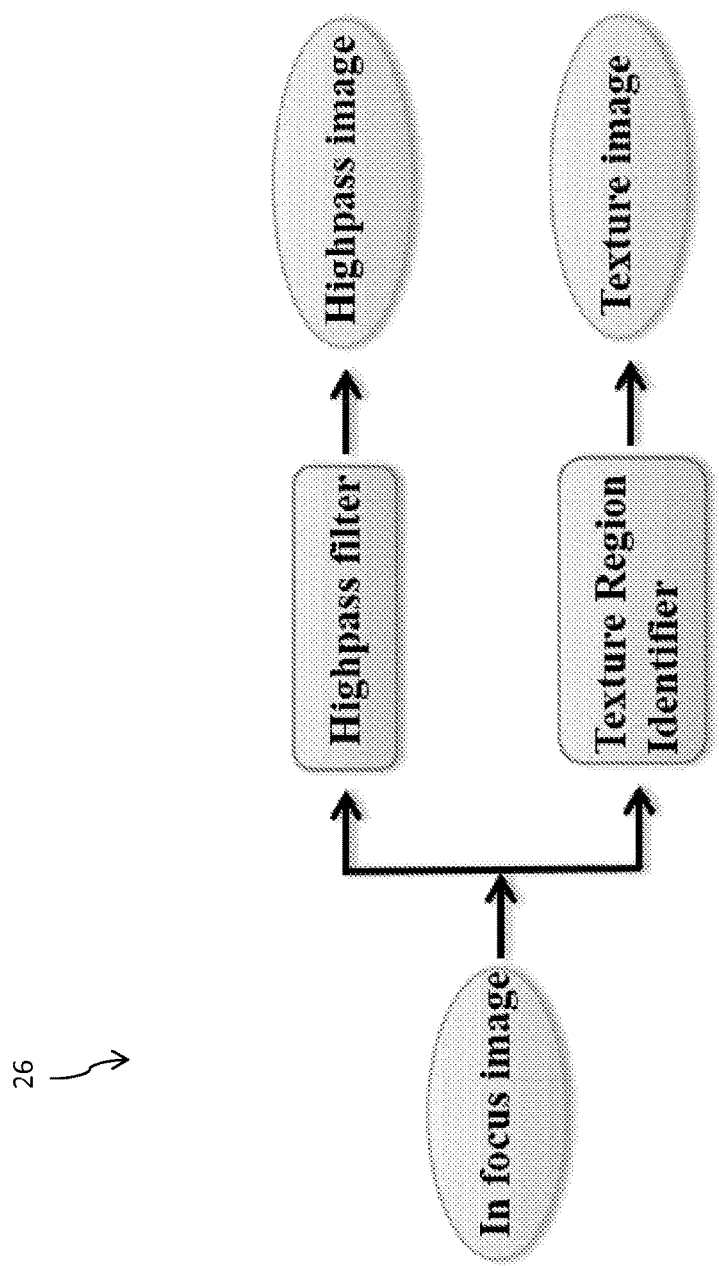
FIG. 5 illustrates an exemplary preprocessing procedure.

From the initial depth map shown in FIG. 4, image processing is used to improve the quality of depth map. One challenging case is where some regions in the image have little or no details with which to infer the depth. For the traditional DfD algorithm, Gaussian filter would "remove" the low frequency objects in the scene which do not contain edges (spatial high frequencies), and the inference algorithm then does not have enough detail to choose one solution. So the initial depth map would have some ambiguous depth value in some texture-less regions. The baseline algorithm can achieve an accurate result in a textured region or on the edges. However to handle the texture-less regions, two new preprocessing functions are introduced. An exemplary preprocessing method 26 is illustrated in FIG. 5. As shown in FIG. 5, the input to the preprocessing is one in-focus image. The first function uses a highpass filter to find the edges, and then generates a highpass image with the same size as the input. The second function is a texture region identifier which determines whether this region is texture-less.

Figure 6:
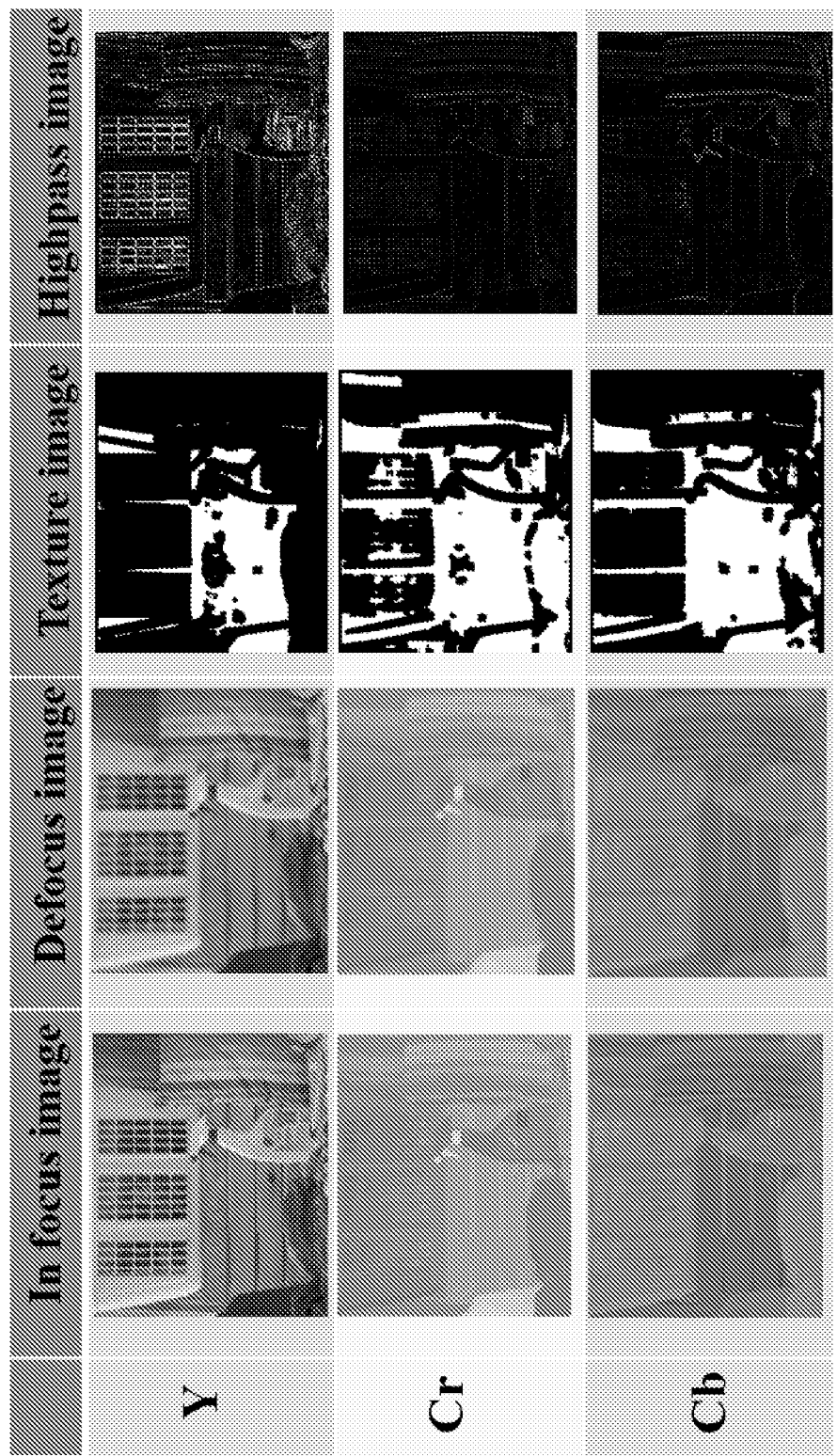
FIG. 6 is an example of input and output preprocessing procedure.

FIG. 6 illustrates an example of input and output of the preprocessing procedure. Column 1 shows the in-focus image. Column 2 shows the highpass image output after applying the filter. Column 3 shows the textured image output from the textured region identifier. The texture-less regions are regions where the squared horizontal intensity gradient averaged over a square window is below a given threshold. As FIG. 6 shows, the textured images are binary ones, where a white region means texture-less and the black region is textured.

Figure 7:
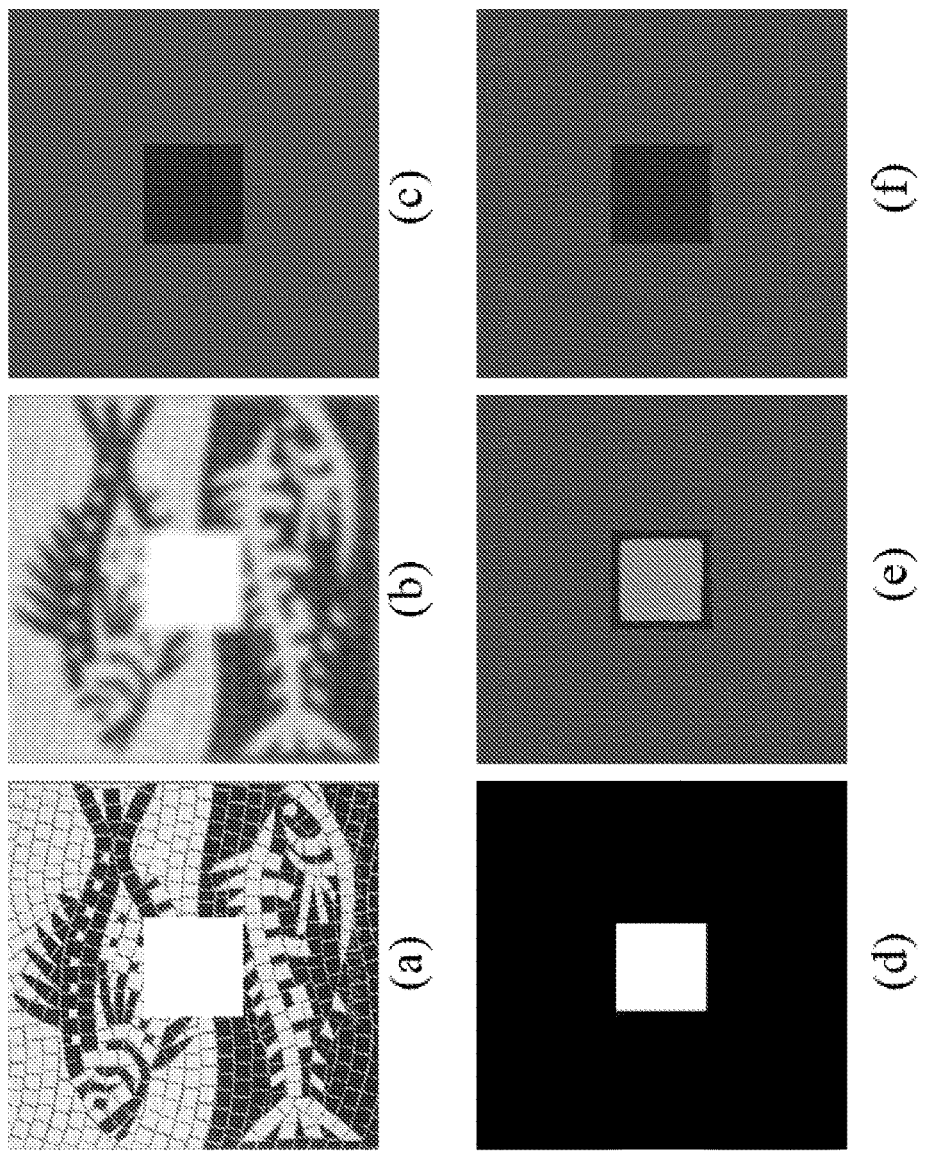
FIG. 7 is an example of the benefits of preprocessing procedure.

FIG. 7 illustrates the benefits of implementing preprocessing on small texture-less regions. FIG. 7(a) shows a synthetic all in focus image with a no-texture region in the center. FIG. 7(c) shows the synthetic ground truth of a texture-less region and textured region at different depths. As FIG. 7(e) shows, the traditional method in an initial depth map can only find accurate results in a textured region or on the boundaries. The preprocessing results in the FIG. 7(f) showing the improved final depth map (much closer to the ground truth) used as input to "Revised MAP Estimation" in next subsection.

D. Revised MAP Estimation Using Texture Information

Referring to Equation (14), the energy function has two terms: data term and smoothing term. The weighting factor β is used to balance the two terms. Since the texture-less region has few details to infer the depth, the goal is to de-emphasize the data term, and rely more on the prior smoothing term in the optimization. Therefore, for each channel (Y,Cb,Cr), it is important to maintain the weighting factor in textured regions; and modify the weighting in texture-less regions. The new addition is to give a higher weighting on the neighboring pixels which are on the boundary of these texture-less regions.

Figure 8:
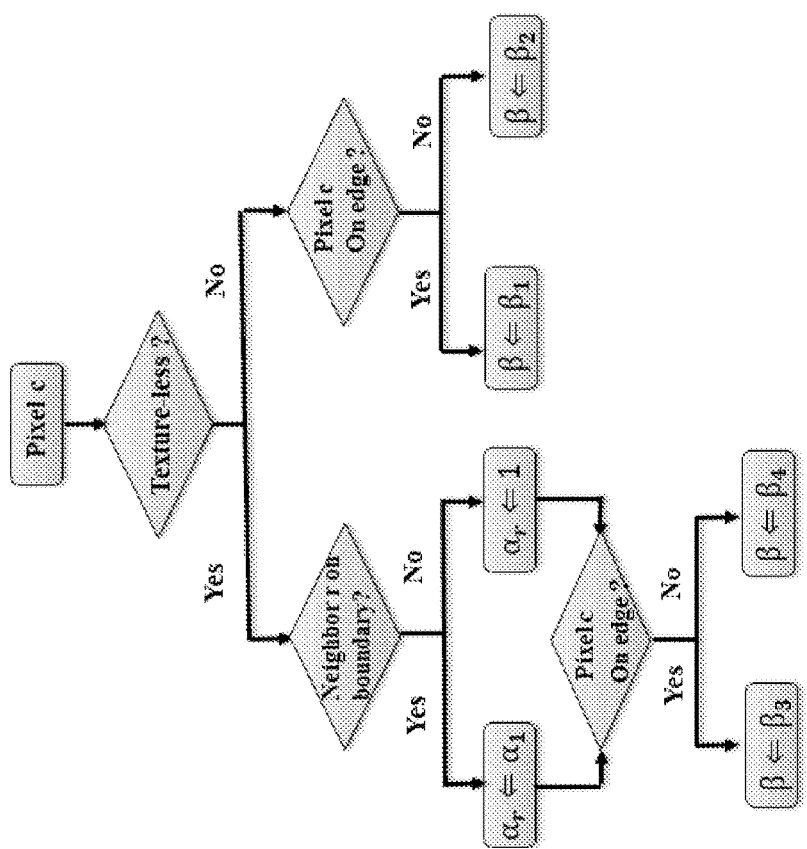
FIG. 8 is a revised MAP estimation.

The decision tree 28 for this adaptation is shown in FIG. 8. For each channel, the first step is to identify if pixel c belongs to texture-less region. If not, the next step is to determine whether pixel c is on the edge. If "Yes", then a smaller value, $\beta_1$, is given to β, otherwise β is set to be a larger value, $\beta_2$. The last step follows equation (14) for MAP estimation.

$$S_c = \text{argmin}\left\{\log \sigma_{S_c} + \frac{(g_c - b_{k_c})^2}{2\sigma_{S_c}^2} + \beta \sum_{r \in N_c} \alpha_r |S_r - S_c|\right\} \quad (18)$$

If pixel c belongs to texture-less region, the 8 neighboring pixels will be checked first to form a new modified energy function, introduced in equation (18). A new weighting factor $\alpha_r$ is involved. If neighbor pixel r is on the boundary of texture-less region which means it could have a higher probability of the correct depth, then a, will be set a large value $\alpha_1$, typically bigger than 1. Otherwise, $\alpha_r$ equals 1. If at least one neighbor pixel r is found on the boundary which has the similar intensity to the center pixel c, then c is merged into a textured region.

The next step is the same as in the textured region, if a pixel c is on the edge, then a smaller value, $\beta_3$, is given for β, otherwise β is set to be a larger value $\beta_4$ ($\beta_4 > \beta_3 > \beta_2 > \beta_1$).

III. Experimental Results

A. Synthetic Image Results

Before implementing the proposed algorithm on video camera, the accuracy has been verified by introducing a synthetic blur based on images that have corresponding real ranging ground truth. For this purpose, the test images and ground truth images from Middlebury 3D imaging website were used.

Middlebury does not have defocus images, only all-focus, so this research uses the Middlebury ranging camera high resolution ground truth images and the in-focus images to generate synthetic defocussed images. At each pixel c in the ground truth image, there was assigned a blur parameter $\sigma_c$ based on the depth ground truth brightness. A total of 256 levels of blur are linearly mapped corresponding to the 256 levels of brightness (brighter means closer to the camera). As mentioned in previous section, the blur function is assumed to be Gaussian. After applying these various Gaussian blurs to each pixel in the all in focus image, a synthetic defocus image is generated. Finally, the in-focus image and synthetic defocus image are used as two input images for verifying the accuracy of the proposed EDfD algorithm.

Figure 9:
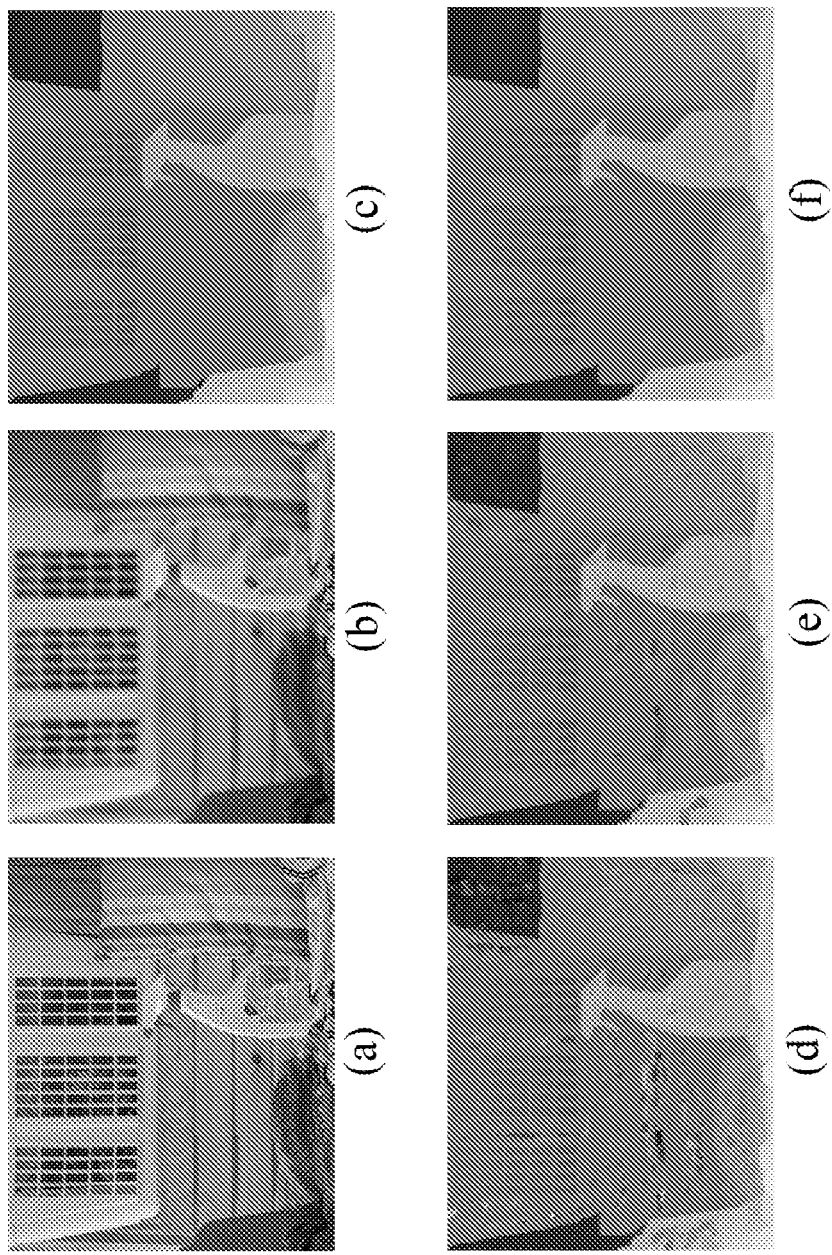
FIG. 9 shows the experimental results of the Middlebury data.

FIG. 9 shows the experimental results of the Middlebury data. FIGS. 9(a) and (c) are the in-focus image and ground truth, respectively. These scenes are directly downloaded from Middlebury's website. FIG. 9(b) is the synthetic defocus image generated by the method above. FIGS. 9(d), (e) and (f) are initial, intermediate and final depth map results. FIG. 9(d) shows the initial depth map result which using the greyscale image as input with the new EM/MPM optimization method. FIG. 9(e) shows the intermediate result after adding in the color components of the image. This YCbCr data provides more information for improving MAP estimation. The FIGS. 9(d) and (e) comparison shows that adding color information reduces misclassifications. However, some problems still appear in the texture-less regions. Finally, in FIG. 9(f), the depth map result is includes the full EDfD method and the accuracy is improved significantly in small texture-less regions, due to the new EDfD.

Figure 11:
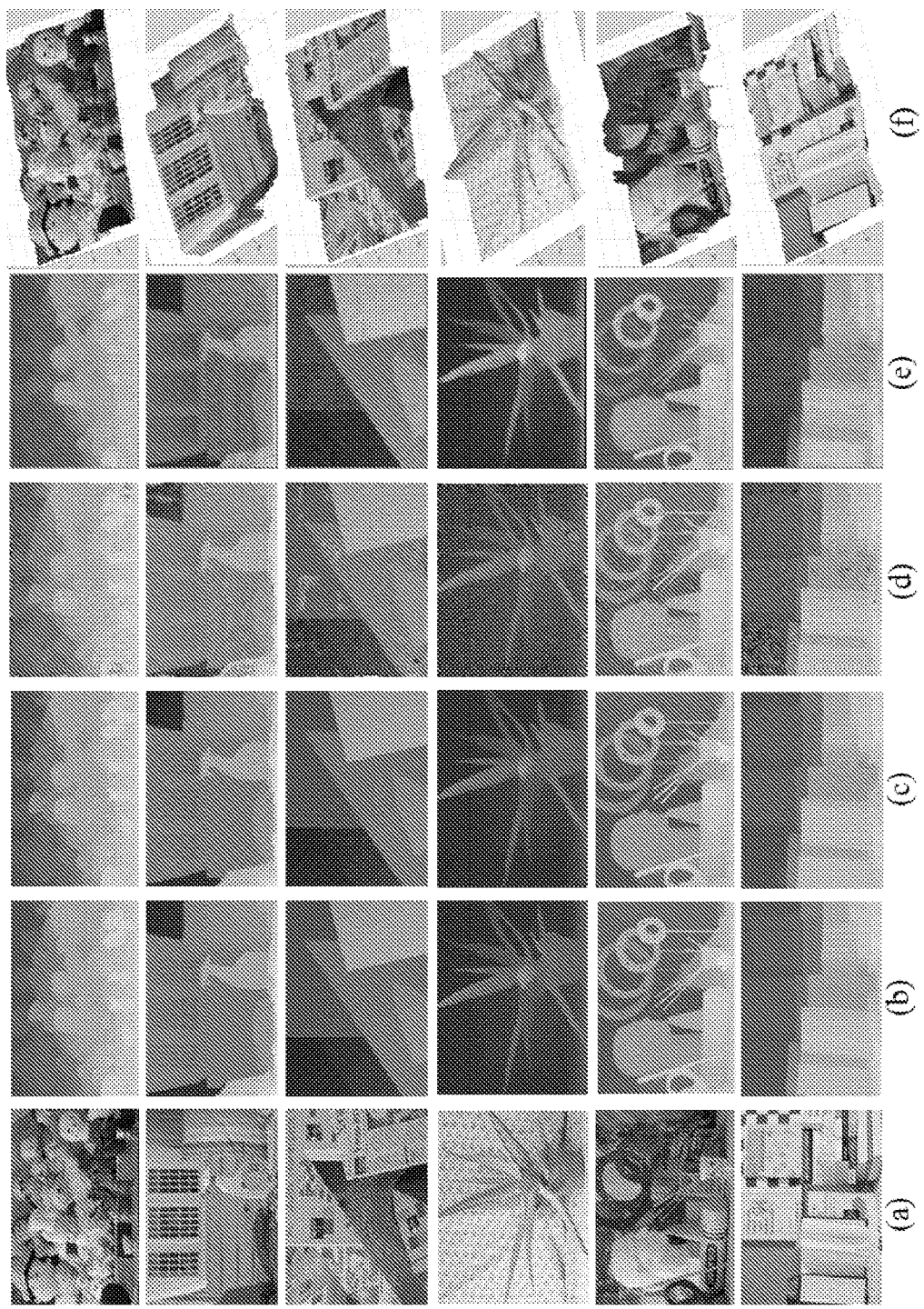
FIG. 11 shows Middlebury result.
Figure 13:
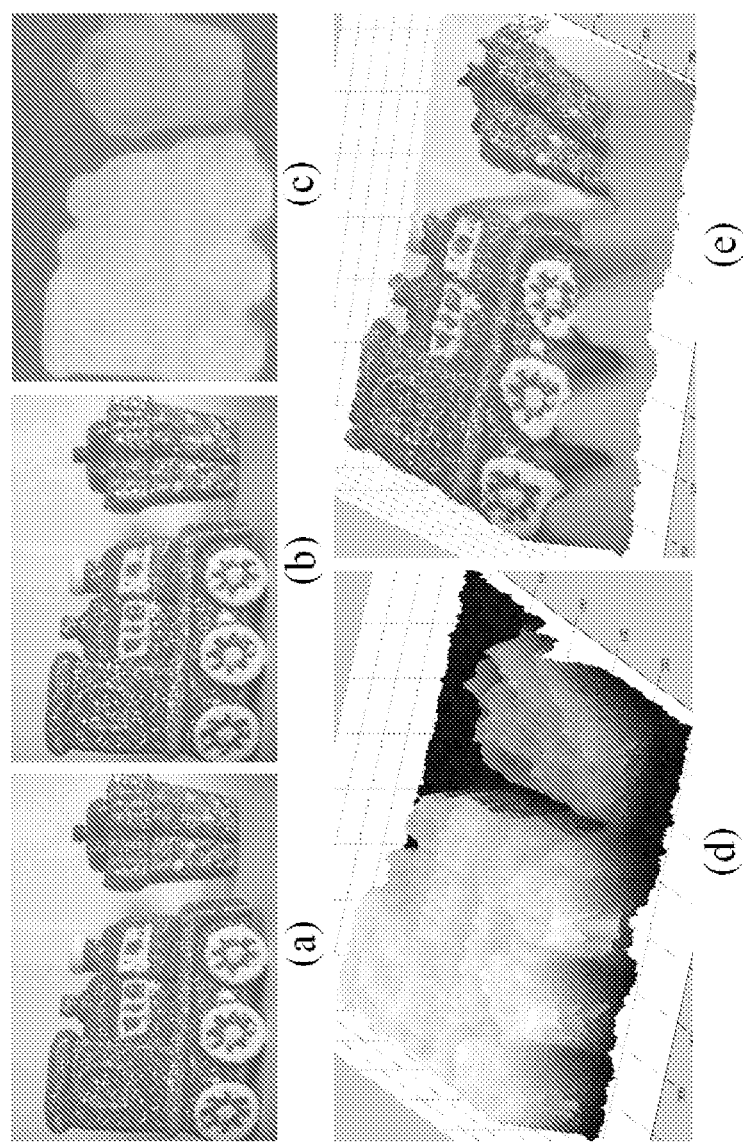
FIG. 13 shows a Train and gift box image.
Figure 14:
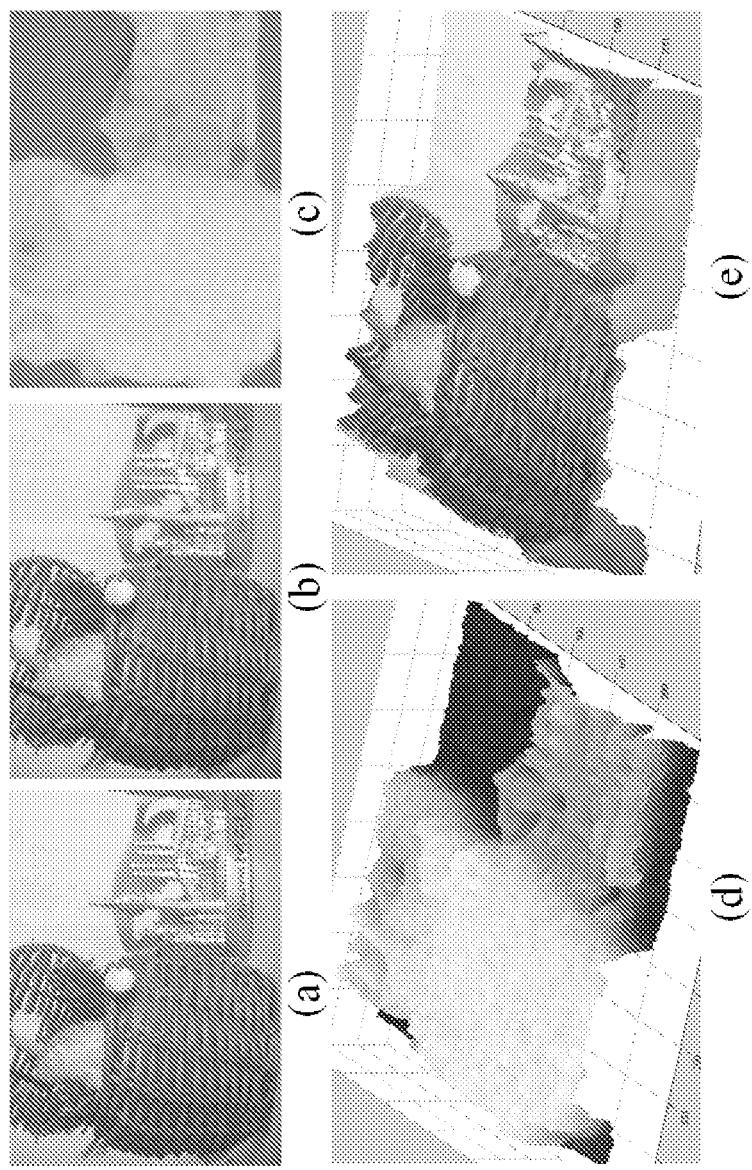
FIG. 14 shows Basket and Malaysia.
Figure 15:
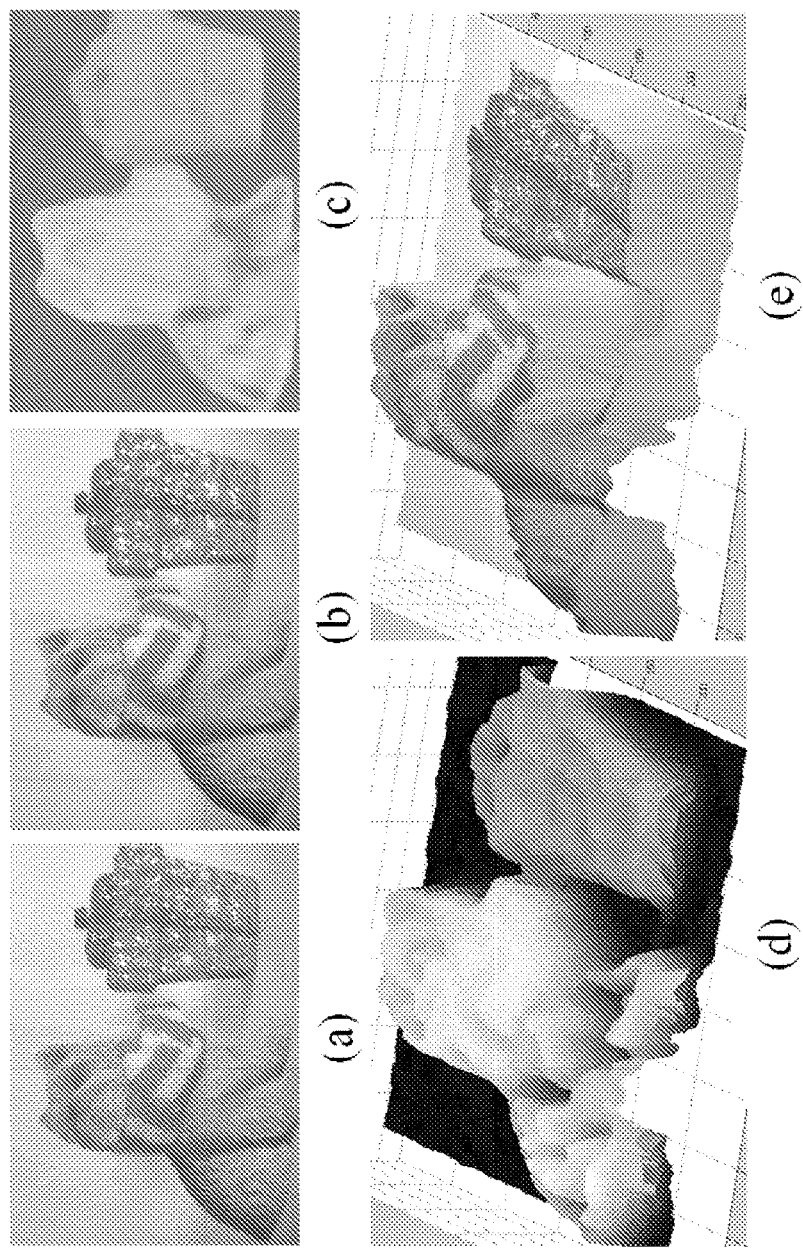
FIG. 15 shows a dog and gift box.
Figure 16:
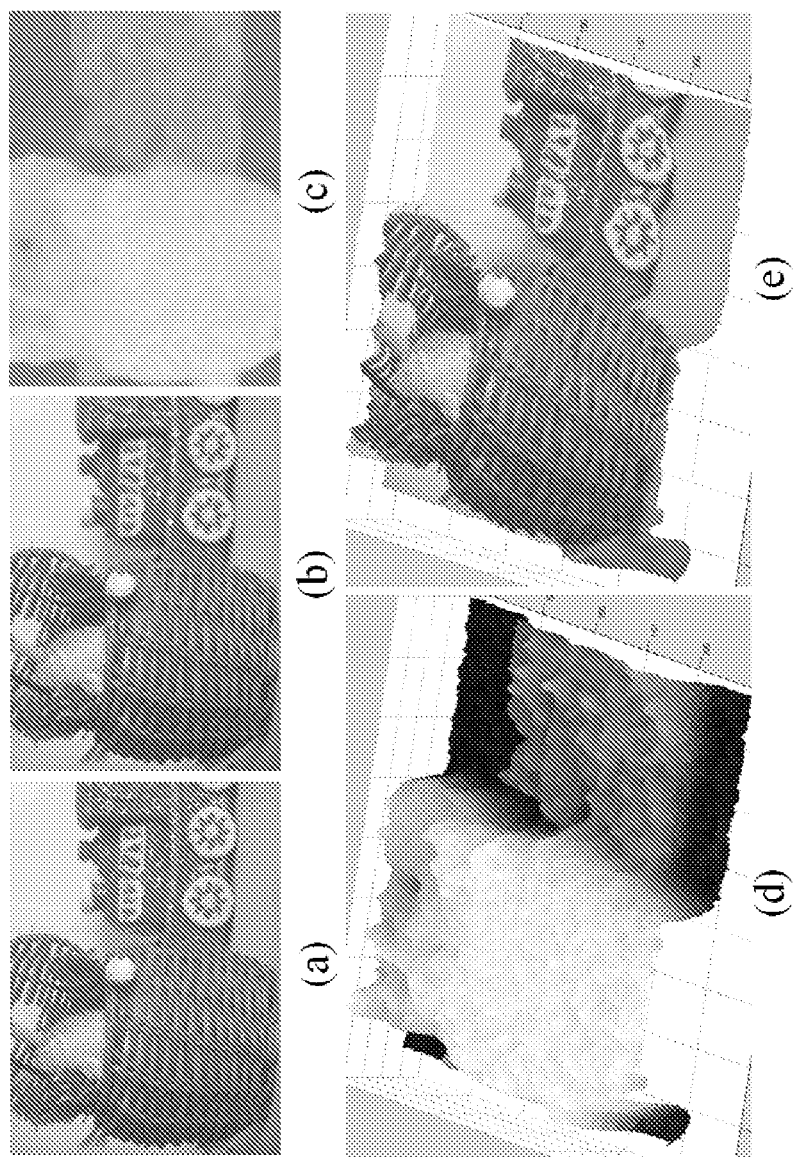
FIG. 16 shows a basket and train.

FIG. 11 compares depth map results of six different images from the Middlebury dataset, with two techniques from the DfD literature. Column (a) shows the source input in-focus images. Column (b) shows ground truth ranging camera depth. In Column (c), the images are depth map results using the EDfD method. The results shown in Column (d) and (e) are using Chaudhuri's DfD method and Favaro's Shape from Defocus method respectively. Chaudhuri's DfD method is based on traditional DfD algorithm, the difference is that it uses Simulated Annealing (SA) as the optimization method for MAP estimation. The Shape from Defocus algorithm uses two defocussed images as input. One is far-focus image and another is near-focus image. In order to fairly compare this method with EDfD, the number of classes was increased to 256 levels. Column (f) contains the 3D view maps using depth information from the EDfD results.

TABLE I

Experimental Results Comparison,
Root Mean Square Error by Method

| Image   | EDfD   | CME    | GME    | SA      | SFD     |
|---------|--------|--------|--------|---------|---------|
| Aloe    | 3.7825 | 4.8843 | 5.5787 | 18.2668 | 14.6188 |
| Art     | 8.2107 | 8.4762 | 9.0997 | 15.6589 | 12.7344 |
| Baby    | 5.8874 | 7.4889 | 9.3466 | 11.7794 | 13.2551 |
| Books   | 4.1916 | 5.7961 | 6.030  | 14.3384 | 16.9813 |
| Doll    | 3.2111 | 5.5235 | 6.4619 | 12.3158 | 14.6848 |
| Laundry | 4.4057 | 6.1087 | 8.6766 | 16.1305 | 17.4083 |
| Poster  | 2.9186 | 4.5216 | 6.7107 | 18.537  | 13.8500 |
| Teddy   | 4.8989 | 6.9491 | 9.3475 | 17.2097 | 12.6796 |

Figure 10:
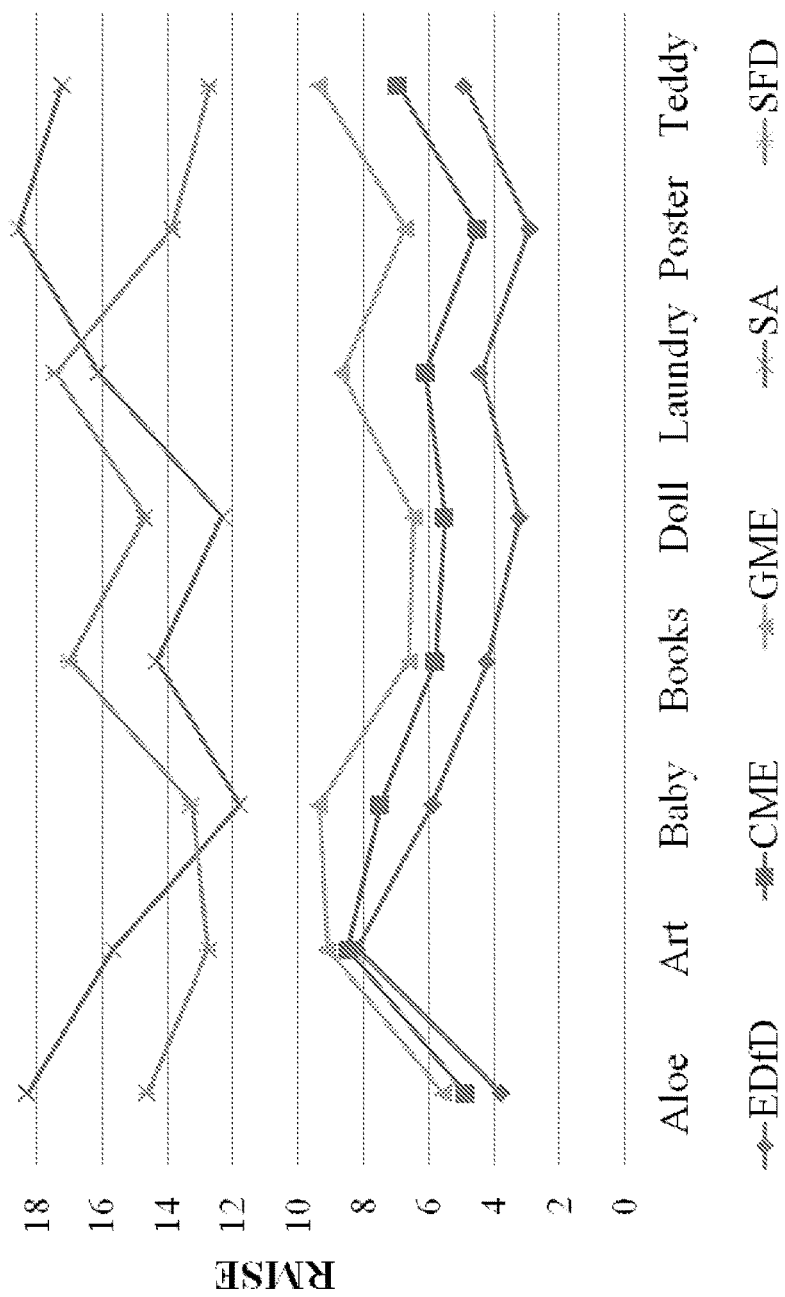
FIG. 10 shows a comparison with other methods on Middlebury image data.

Using the Root Mean Square Error (RMSE) of the calculated depth map against the ground truth, Table I and FIG. 10 compare the proposed EDfD results to the results using other methods. Eight sample images are compared from the Middlebury dataset: Aloe, Art, Baby, Books, Doll, Laundry, Poster and Teddy. The EDfD method is shown against four different methods. Two methods are the closest previous literature methods: Simulated Annealing (SA), Chaudhuri's DfD, method and Favaro's Shape from Defocus method (SFD). In addition two new additional methods were explored: CME (Color plus the EM/MPM) and GME (Gray plus EM/MPM). These two method are used to generate intermediate and initial results respectively as illustrated in FIGS. 9 (d) and (e). From Table I and FIG. 10, it is shown that for each test image, the proposed EDfD method achieves the most accurate results. While the average RMSE for EDfD is 4.677, which indicates the error rate is about 4.677/256=0.018. The average accuracy is 98.18%.

B. Images Captured from Camera with Microfluidic Lens

Since the accuracy of the proposed EDfD method was refined by using synthetic images; the next step is to verify that a camera with a microfluidic lens can achieve the same quality result. A single imager with a fast-focus microfluidic lens is needed. Some focus and optical performance experiments with this lens were previously introduced.

FIGS. 12A and 12B show exemplary single imager systems. The exemplary system 30 includes a microfluidic lens 32, a lens focus controller 34, a complementary metal-oxide-semiconductor (CMOS) imager 36, and a CMOS imager development board 38. The system 30 further includes memory 40, one or more processors 42, and a user interface 44.

An electrowetting microfluidic lens 32 was used to capture the focused and defocused images in real time. Exemplary microfluidic lenses 32 include the Artic 316 variable focus liquid lens from Variopotic, a Business unit of Parrot SA, Paris France. This particular lens 32 has a focus that can be adjusted continuously up to 30 frames per second. It also has a very fast response time and wide focus range from 10 cm to infinity. The microfluidic lens 32 was illustratively coupled to a Cpspian C Com Variable Focus Liquid Lens Driver Board and a Lattice HDR-60 Camera Reference Design Board, both available from Varioptic.

Logic controlling system 30 may be implemented in hardware or in hardware executing software. Exemplary software and image files may be stored in memory 40. The system 30 illustratively includes one or more processors 42 or other structures to implement the logic. Memory 40 is a non-transitory computer readable medium and may be a single storage device or may include multiple storage devices, located either locally with processor 42 or accessible across a network, or partially locally with processor 42 and partially accessible across a network. Computer-readable media may be any available media that may be accessed by processor 42 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, servers, Digital Versatile Disk (DVD) or other optical disk storage, magnetic cassettes, magnetic tape, magnetic disk storage or other magnetic storage devices, or any other medium which may be used to store the desired information and which may be accessed by processor 42. In one embodiment, processor 42 communicates data, status information, or a combination thereof to a remote device for storage, analysis, or carrying out a predetermined command. In another embodiment, memory 40 may further include operating system software. Memory 40 further includes communications software for communication with a network, such as a local area network, a public switched network, a CAN network, and any type of wired or wireless network. An exemplary public switched network is the Internet. Exemplary communications software includes e-mail software, SMS, Bluetooth communication software, radio frequency communication software, near field communication software and internet browser software. Other suitable software which permits processor 42 to communicate with other devices across a network may be used.

As illustrated in FIG. 12B, system 30 further includes a user interface 44 comprising one or more I/O modules which provide an interface between an operator or environment or both, and system 30. Exemplary I/O modules include input members and output members. Exemplary input members include buttons, switches, keys, a touch display, a microphone, a camera or other optical reader, a keyboard, a mouse, a transceiver, a sensor, and other suitable devices or methods for providing information to controller. Exemplary output devices include lights, a display (such as a touch screen), printer, vibrator, speaker, visual devices, audio devices including alarm/speaker, tactile devices, transceiver, and other suitable devices or methods for presenting information to an operator or a machine.

In one exemplary embodiment, an image is formed on the CMOS imager 36, then the camera passes data to development board 38 in real time. The system 30 sends commands to lens focus controller 34. By changing the voltage, the lens controller 34 can change the focus settings of the microfluidic lens 32 and different focus images appear on the imager 36. Once the system is connected, an image such a video is sent to the computer and observed on the user interface 44, such as a monitor.

By using this single imager system 30, both still and motion images can be collected. FIG. 13 to FIG. 16 show four different collected images captured by this single imager system 30. In every figure, (a) are in-focus images are captured by the camera. The (b) images are the defocused images which are captured directly by the camera at a different lens voltage. The column (c) are the depth maps generated by the EDfD algorithm. In (d) the 3D view maps of EDfD depth maps can be seen. Finally, in (e) are shown the 3D view maps which are generated by in-focus images and depth maps.

In order to confirm the real time operation of the lens and algorithm, the algorithm's running time was tested on PC with single CPU. The size of test images were 640 by 480 and OpenCV library was used for the research. The average running time of the EDfD components is summarized in Table II. As shown in this table, the iterative MAP-EM/MPM (revised MAP estimation algorithm) is the dominant factor. Table II only shows the starting frame, not a frame to frame processing. For frame to frame processing, Table III reflects that the initial depth generation is no longer needed because the calculated depth map of previous frame is used as initial depth map. Because this is a good estimate, the MAP-EM/MPM step converges to final result much faster than the starting frame. With the Middlebury data, the starting picture requires 40 iterations for convergence, however for the frame-to-frame speed using the previous depth map only requires 8 iterations. For these experiments, the research has not yet taken advantage of any parallelism.

By using the same dataset, the calculated the running time for SA-DfD and SFD was researched. For SA-DfD, the running time was tested on the same PC and also using OpenCV library. The average running time is 238.491 s. And for SFD, the running time was tested using running parallel on 8 CPUs. The average running time is 77.182 s, using the 8 times parallelism. Compared the running time with these two algorithms, the EDfD research in the same order of magnitude, but is not fast enough. Considering parallel execution in software, 8 times improvement is feasible in EDfD speed. In addition, previous research employs FPGA parallelism, where it was shown that the implementation of the EM/MPM function achieves over 100 times speed improvement. So, the conclusion is that this EDfD research is capable of real-time operation.

TABLE II

Average Running time for each starting picture

| Steps | Running time (sec.) |
|---|---|
| Initial depth generation | 27.532 |
| Preprocessing | 0.143 |
| Gaussian blur generation | 28.724 |
| MAP-EM/MPM (40 iterations) | 425.879 |

TABLE III

Average Running time for frame to Frame processing

| Steps | Running time (sec.) |
|---|---|
| Preprocessing | 0.143 |
| Gaussian blur generation | 28.724 |
| MAP-EM/MPM (8 iterations) | 85.617 |

These results have shown a very favorable accuracy result for EDfD at an average Root Mean Squared Error (RMSE) of 4.67 gray level steps (1.8%) compared to ranging ground truth. This is an improvement of nearly 2 times when compared to standard techniques (SA-DfD and SFD). In addition, the microfluidic lens is capable of focus change at speeds fast enough to match the movie camera speed. The algorithm speed is approach real time movie speeds, and has significantly improved performance compared to other methods on a standard PC platform.

IV. Use of Graph Cut in Place of EM/MPM

As shown above, the EDfD method follows the MAP estimation of the equation (19) below.

$$S_c = \operatorname{argmin}\left\{\log \sigma_{S_c} + \frac{(g_c - b_{k_c})^2}{2\sigma_{S_c}^2} + \beta \sum_{r \in N_c} \alpha_r |S_r - S_c|\right\} \quad (19)$$

As discussed above, the EM/MPM method and find the best choice of blur label for each pixel. It was next investigated instead of using EM/MPM, to apply Graph cut method, as described by Y. Boykov and V. Kolmogorov, "An experimental comparision of min-cut/max-flow algorithms for energy minimization in vision," *PAMI, IEEE Transaction on*, 26(9):1124-1137, September 2004, incorporated by reference herein in its entirety, on our MAP estimation to find the global minimum.

Figure 17:
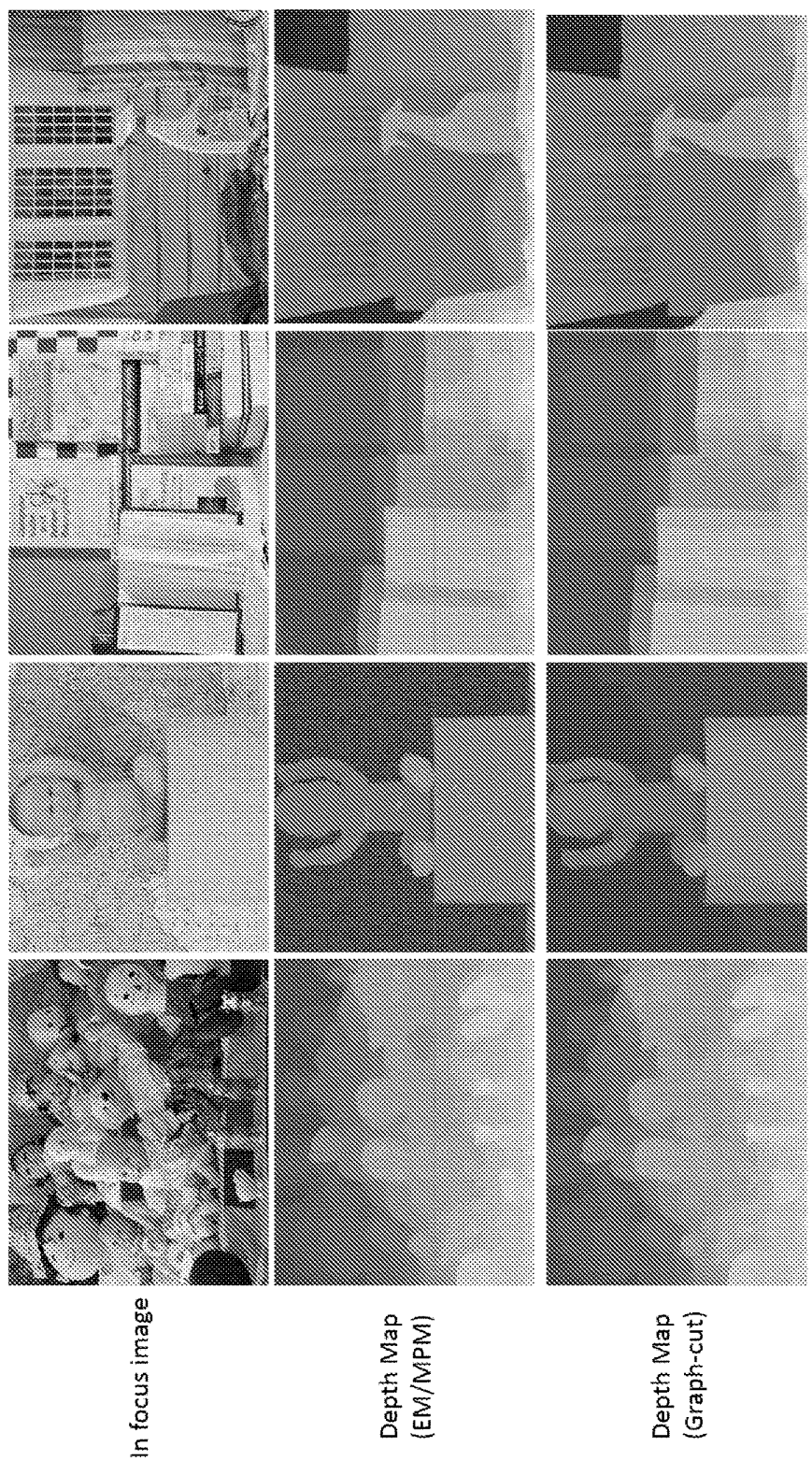
FIG. 17 shows results for an infocus image, a depth map using EM/MPM, and a depth map using graph cut for four different images.

The results of the method utilizing graph-cut are provided in FIG. 17 and Table III below. As shown in Table III, the use of graph-cut reduced the MAP running time by over 90%.

TABLE III

AVERAGE RUNNING TIME FOR EACH STARTING PICTURE

| Step | Running time (sec.) |
|---|---|
| Initial depth generation | 27.532 |
| Preprocessing | 0.143 |
| Gaussian blur generation | 28.724 |
| MAP-EM/MPM (40 iterations) | 425.879 |
| MAP-Graph-cut | 37.728 |

V. Space Varying Point Spread Function (PSF)

Based on the results above, the point spread function of blur kernel in the real world is not space-invariant.

Figure 18:
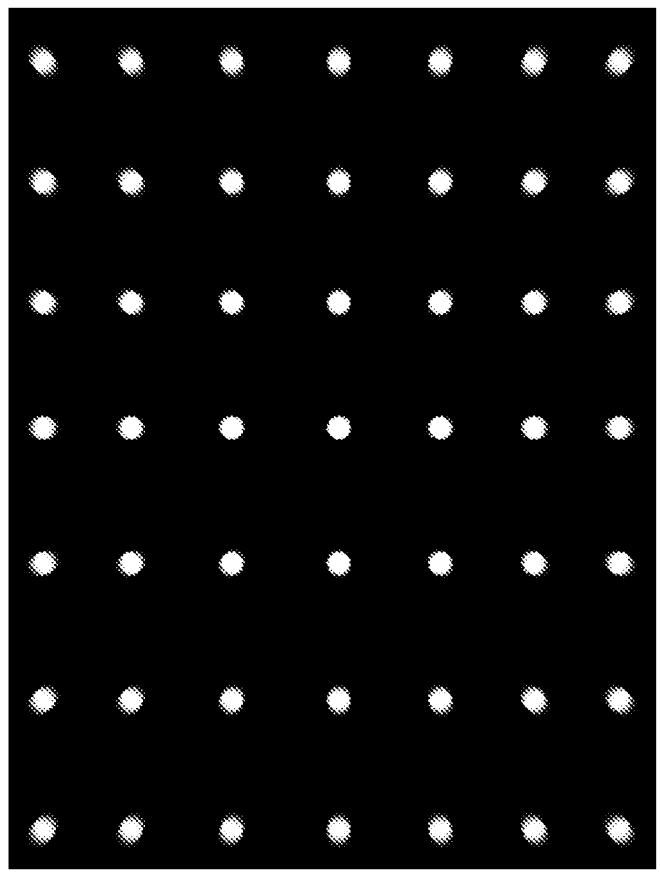
FIG. 18 shows the kernel shape and blur for an exemplary system.
Figure 19:
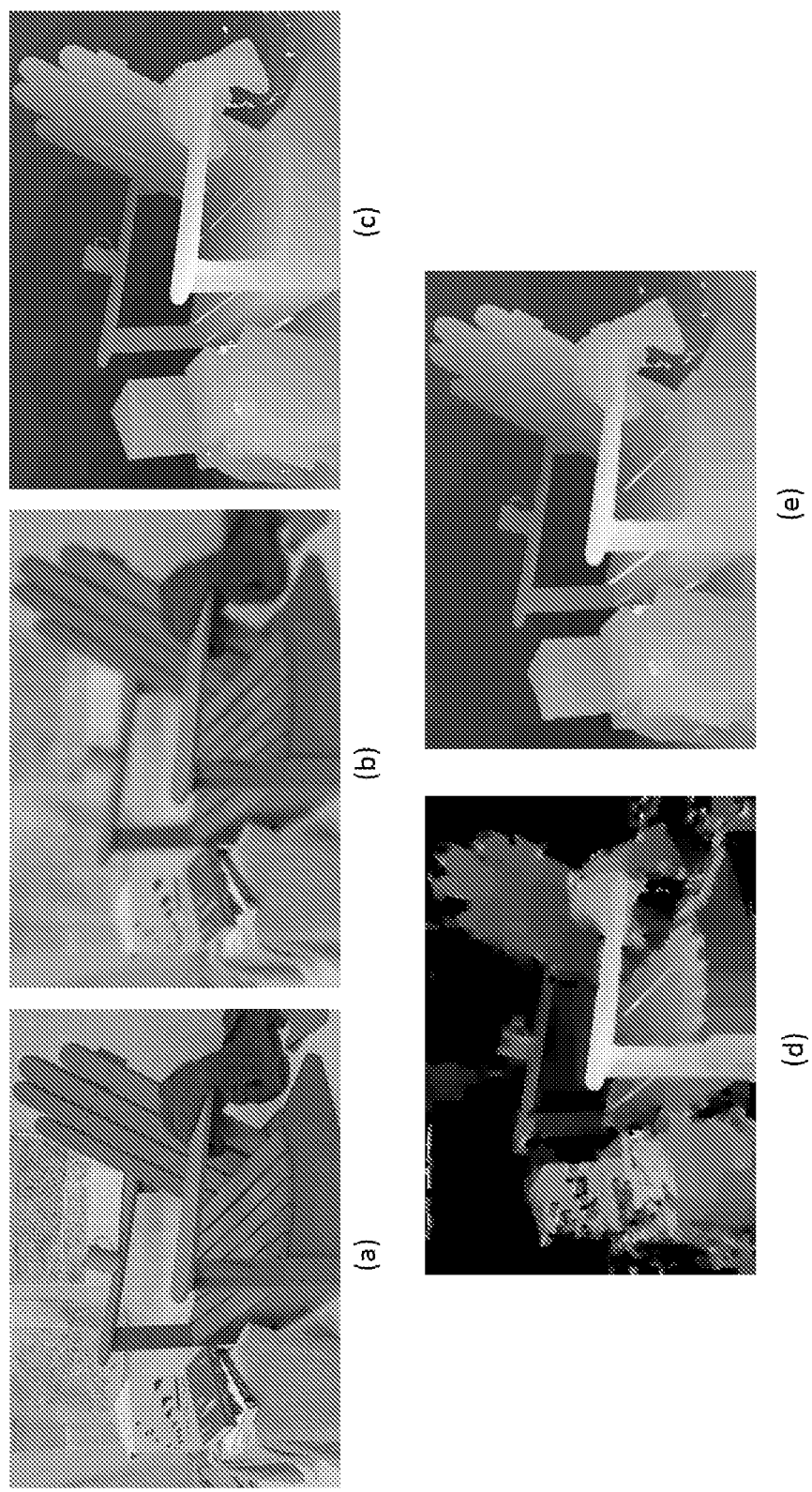
FIG. 19 shows a chair image.

At the same distance, the kernels' shape and blur are different throughout the image as shown in FIG. 18. Use of a typical space-invariant Gaussian filter to model the blur from the camera in real world, does not account for the differences throughout the image, and results in additional inaccuracies in determining the depth map. As shown in FIG. 19, a space-varying filter based on the difference between the kernels' shape and blur was used to produce the depth map results from a synthetic image. FIG. 19A is the in focus image, FIG. 19B is the defocus image, FIG. 19C is the ground truth, FIG. 19D is a comparative depth map by using space-invariant Gaussian filter, and FIG. 19E is a comparative depth map using a correct space-varying Gaussian model. As shown by comparing FIGS. 19D and 19E with the ground truth FIG. 19C, utilization of a space-varying Gaussian model produced a more accurate depth map.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A system for determining depth of an image comprising:
    a microfluidic lens having a variable focal length controlled by a lens controller;
    an imager receiving an image of an object from the lens, wherein the imager is configured to receive a first image comprising a first plurality of pixels from the lens at a first focal length and a second image comprising a second plurality of pixels from the lens at a second focal length, the second focal length being different than the first focal length, wherein the first image and the second image are color images;
    non-volatile memory, wherein the first image and the second image are stored in the non-volatile memory; and
    a depth module configured to determine a distance between the lens and the object based by a comparison of the first image of the object and the second image of the object, wherein the depth module is configured to determine the distance between the lens and the object based in part on:
        converting the first image to a first YCbCr image and the second image to a second YCbCr image; and
        preprocessing the first YCbCr image by applying a high-pass filter to the first YCbCr image to define a plurality of regions of the first YCbCr image, and applying a texture region identifier to each of the plurality of regions to determine whether each region is a textured region or a texture-less region.

2. The system of claim 1, wherein the imager is a CMOS imager.

3. The system of claim 1, wherein the first image is an in-focus image of the object and the second image is an out-of focus image of the object.

4. The system of claim 1, further comprising a video stored in the non-volatile memory, wherein the video comprises a plurality of images including the first image and the second image.

5. The system of claim 1, wherein the depth module is further configured to determine the distance between the lens and the object based in part on:
    preprocessing the second YCbCr image;
    generating an initial depth map for the first YCbCr image and the second YCbCr image; and
    generating a revised depth map based on the initial depth map and the preprocessed first YCbCr image and preprocessed second YCbCr image.

6. The system of claim 5, wherein generating the initial depth map includes using an Expectation Maximization/Maximization of Posterior Marginals optimization algorithm.

7. The system of claim 6, wherein the first image is an in-focus image of the object and the second image is an out-of focus image of the object and the Expectation Maximization/Maximization of Posterior Marginals optimization algorithm includes optimizing for each pixel (c) the value:

$$logpost(c,k) = log\sigma_k + \frac{(I_{def}(c) - I_{bk}(c))^2}{2\sigma_k^2} + \sum_{r \in N_c} |I_S(r) - S_c(k)|$$

wherein:
    k is 1-256;
    $\sigma_k$ is a Gaussian blur parameter for the pixels of class k;
    $I_{def}(c)$ is an image value of one pixel of the plurality of second pixels of the second image;
    $I_{bk}(c)$ is an image value of one pixel of the plurality of first pixels of the first image following an application of a Gaussian filter to the first image;
    $N_c$ is the total number of pixels;
    $I_s(r)$ is an initial depth map of pixel (r); and
    $S_c$ is a depth class label of a center pixel.

8. The system of claim 6, wherein the first image is an in-focus image of the object and the second image is an out-of focus image of the object and the Expectation Maximization/Maximization of Posterior Marginals optimization algorithm comprises:
    applying 256 different Gaussian filters to the first image; and
    optimizing a value for each pixel of the second plurality of pixels, wherein the value includes a comparison of the second image and the filtered first images;
    wherein the initial depth map is based on the optimized value for each pixel.

9. The system of claim 5, wherein generating the initial depth map includes using an Graph-cut algorithm.

10. The system of claim 5, wherein the generating an initial depth map includes determining the initial depth map based on a space varying point spread function for each pixel based on a kernel shape and blur function.

11. The system of claim 1 wherein generating a revised depth map further comprises determining a depth class label for each pixel according to:

$$S_c = \mathrm{argmin}\left\{log\sigma_{S_c} + \frac{(g_c - b_{k_c})^2}{2\sigma_{S_c}^2} + \beta \sum_{r \in N_c} \alpha_r |S_r - S_c|\right\}$$

wherein:
    $S_c$ is the depth class label for pixel c;
    $S_r$ is the depth class label for neighboring pixel r;
    $\sigma_{S_c}$ is a Gaussian blur parameter for the depth class label for pixel c;
    $g_c$ is an image value of pixel c of the plurality of second pixels of the second image;
    $b_{kc}$ is an image value of one pixel of the plurality of first pixels of the first image following an application of a Gaussian filter to the first image; and
    $\alpha$ and $\beta$ are weighting factors, wherein
        $\alpha$ is 1 if the pixel c is a portion of a texture-less region and neighboring pixel r is not on a boundary of a texture-less region, else $\alpha$ is greater than 1; and
        $\beta$ is a first value $\beta_1$ if the pixel c is a portion of a textured region and pixel c is on an edge of a texture-less region; is a second value $\beta_2$ if the pixel c is a portion of a textured region and pixel c is not on an edge of a texture-less region; is a third value $\beta_3$ if the pixel c is a portion of a texture-less region and pixel c is on an edge of a texture-less region; is a fourth value $\beta_4$ if the pixel c is a portion of a textured region and pixel c is not on an edge of a texture-less region; wherein $\beta_4 > \beta_3 > \beta_2 > \beta_1$.

12. A method of determining a depth of a position an image, the method comprising:
    providing a microfluidic lens having a focal length set to a first focal length;

receiving a first image of an object through the microfluidic lens at the first focal length;

adjusting the focal length of the microfluidic lens to a second focal length, wherein the second focal length is different than the first focal length;

receiving a second image of an object through the microfluidic lens at the second focal length, wherein the first image and the second image are color images and wherein the first image is an in-focus image of the object and the second image is an out-of focus image of the object; and determining a distance between the lens and the object based on a comparison of the first image and the second image, wherein determining the distance between the lens and the object is based in part on:

converting the first image to a first YCbCr image and the second image to a second YCbCr image; and preprocessing the first YCbCr image by applying a high-pass filter to the first YCbCr image to define a plurality of regions of the first YCbCr image, and applying a texture region identifier to each of the plurality of regions to determine whether each region is a textured region or a texture-less region.

13. The method of claim 12, wherein determining the distance between the lens and the object is further based in part on:

preprocessing the second YCbCr image;

generating an initial depth map for the first YCbCr image and the second YCbCr image; and generating a revised depth map based on the initial depth map and the preprocessed first YCbCr image and preprocessed second YCbCr image.

14. The method of claim 13, wherein generating the initial depth map comprises:

applying 256 different Gaussian filters to the first image; and optimizing a value for each pixel of the second plurality of pixels, wherein the value includes a comparison of the second image and the filtered first images;

wherein the initial depth map is based on the optimized value for each pixel.

15. The method of claim 13, wherein generating the initial depth map comprises optimizing for each pixel (c) the value:

$$logpost(c,k) = log\sigma_k + \frac{(I_{def}(c) - I_{bk}(c))^2}{2\sigma_k^2} + \sum_{r \in N_c} |I_S(r) - S_c(k)|$$

wherein:

k is 1-256;

$\sigma_k$ is a Gaussian blur parameter for the pixels of class k;

$I_{def}(c)$ is an image value of one pixel of the plurality of second pixels of the second image;

$I_{bk}(c)$ is an image value of one pixel of the plurality of first pixels of the first image following an application of a Gaussian filter to the first image;

$N_c$ is the total number of pixels;

$I_s(r)$ is an initial depth map of pixel (r); and $S_c$ is a depth class label of a center pixel.

16. The method of claim 13, wherein generating the initial depth map comprises applying an Graph-cut algorithm to the first YCbCr image and the second YCbCr image.

17. The method of claim 13, wherein generating the initial depth map includes determining the initial depth map based on a space varying point spread function for each pixel based on a kernel shape and blur function.

18. The method of claim 13, wherein generating a revised depth map further comprises determining a depth class label for each pixel according to:

$$S_c = \operatorname{argmin}\left\{log\sigma_{S_c} + \frac{(g_c - b_{k_c})^2}{2\sigma_{S_c}^2} + \beta \sum_{r \in N_c} \alpha_r |S_r - S_c|\right\}$$

wherein:

$S_c$ is the depth class label for pixel c;

$S_r$ is the depth class label for neighboring pixel r;

$\sigma_{S_c}$ is a Gaussian blur parameter for the depth class label for pixel c;

$g_c$ is an image value of pixel c of the plurality of second pixels of the second image;

$b_{kc}$ is an image value of one pixel of the plurality of first pixels of the first image following an application of a Gaussian filter to the first image; and $\alpha$ and $\beta$ are weighting factors, wherein $\alpha$ is 1 if the pixel c is a portion of a texture-less region and neighboring pixel r is not on a boundary of a texture-less region, else $\alpha$ is greater than 1; and $\beta$ is a first value $\beta_1$ if the pixel c is a portion of a textured region and pixel c is on an edge of a texture-less region; is a second value $\beta_2$ if the pixel c is a portion of a textured region and pixel c is not on an edge of a texture-less region; is a third value $\beta_3$ if the pixel c is a portion of a texture-less region and pixel c is on an edge of a texture-less region; is a fourth value $\beta_4$ if the pixel c is a portion of a textured region and pixel c is not on an edge of a texture-less region; wherein $\beta_4 > \beta_3 > \beta_2 > \beta_1$.

* * * * *